US010791836B2

(12) United States Patent
Holt (10) Patent No.: US 10,791,836 B2
(45) Date of Patent: Oct. 6, 2020

(54) MOUNTING APPARATUS FOR SECURING A DEVICE TO A FLAT MONITOR (71) Applicant: Gerald Dwayne Holt, Klamath Falls, OR (US)

(72) Inventor: Gerald Dwayne Holt, Klamath Falls, OR (US)

(73) Assignee: Reit Lab, LLC, Klamath Falls, OR (US)

( * ) Notice: Subject to any disclaimer, the term of this patent is extended or adjusted under 35 U.S.C. 154(b) by 0 days.

(21) Appl. No.: 15/644,836

(22) Filed: Jul. 10, 2017

(65) Prior Publication Data
US 2018/0008044 A1 Jan. 11, 2018

Related U.S. Application Data (60) Provisional application No. 62/360,642, filed on Jul. 11, 2016.

(51) Int. Cl.
*G06F 1/16* (2006.01)
*H05K 5/00* (2006.01)
*H05K 7/00* (2006.01)
*A47B 97/00* (2006.01)
*F16B 2/00* (2006.01)
*F16B 2/22* (2006.01)

(52) U.S. Cl.
CPC .............. *A47B 97/00* (2013.01); *F16B 2/005* (2013.01); *F16B 2/22* (2013.01); *G06F 1/1605* (2013.01); *G06F 1/1607* (2013.01); *G06F 1/1616* (2013.01); *G06F 1/1637* (2013.01); *G06F 1/1686* (2013.01); *A47B 2097/005* (2013.01)

(58) Field of Classification Search
CPC .... G06F 1/1607; G06F 1/1609; G06F 1/1611; G06F 1/1601; G06F 1/1605; G06F 1/1616; G06F 1/1639; G06F 1/1633; G06F 1/1684; F16B 2/005; F16B 2/22
USPC ............ 361/679.01, 679.02, 679.21, 679.26, 361/679.55, 679.56, 679.23, 679.22
See application file for complete search history.

(56) References Cited

U.S. PATENT DOCUMENTS

| 7,854,420 | B2* | 12/2010 | Depay | G06F 1/1607 248/316.7 |
| 8,191,837 | B2* | 6/2012 | Chen | G06F 1/1607 248/176.1 |
| 9,339,112 | B2* | 5/2016 | Wengreen | A47B 97/00 |
| 2005/0211861 | A1 | 9/2005 | Lee et al. | |
| 2010/0288895 | A1* | 11/2010 | Shamie | F16M 11/041 248/222.14 |
| 2014/0061406 | A1* | 3/2014 | Chevalier | F16M 11/08 248/205.1 |

\* cited by examiner

*Primary Examiner* — Anthony M Haughton
(74) *Attorney, Agent, or Firm* — Graham Casanova Alig; Alig Patent Law (57) ABSTRACT

An apparatus for holding a computer peripheral device (including, but not limited to, an external hard drive, a smartphone, and an external CPU) securely and conveniently to a flat screen monitor is presented. A system for securing a computer peripheral device to a laptop computer to optimize the use of space and practice clean organization is also presented. Further presented is a method and system that provides privacy during the use of a laptop computer.

18 Claims, 11 Drawing Sheets

MOUNTING APPARATUS FOR SECURING A DEVICE TO A FLAT MONITOR

CROSS-REFERENCE TO PRIOR FILED APPLICATION

This application claims priority to an earlier filed provisional application 62/360,642 filed on Jul. 11, 2016, which is herein incorporated by reference in its entirety.

FIELD OF THE DISCLOSURE

The present disclosure generally relates to an apparatus for holding a computer peripheral device securely and/or conveniently to a flat screen monitor. The present disclosure also relates to a set-up of a portable computer and its peripheral devices for convenient use, particularly in close quarters. This present disclosure still further relates to a method of securing a computer peripheral device to a flat screen monitor. It is also noted that this disclosure relates to security and privacy with the use of laptop computers and their peripheral devices.

BACKGROUND

Laptop computers enable users to operate computers in a wide variety of environments from ski cabins to airplane cabins, from the coffee house to the clubhouse. The freedom that laptop offers does not always also provide adequate free space to operate the laptop and all the desired peripheral devices in a convenient and secure manner. This is not a new problem, such a problem has existed since the first portable computer and associated peripheral device were introduced. In short time many solutions have been offered to solve this problem; however, each is inadequate for various reasons. Presented below are a selection of admirable attempts to solve the problem of securing a peripheral device to a flat screen monitor and a brief summary of the inadequacy of each attempted solution.

U.S. Pat. No. 5,769,374 entitled, "Apparatus for mounting a computer peripheral device at selectively variable locations on a display monitor," issued Jun. 11, 1998, discloses apparatus and method of attaching a peripheral device to a desktop cathode-ray-tube-type monitor. A screw-type mechanism for attaching the apparatus is disclosed. Although the inventor address a similar problem U.S. Pat. No. 5,769,374 lacks specific adaption for laptop flat screen monitors and lacks the convenience of a hanging attachment. Furthermore, the disclosed invention is not intended for portable use.

U.S. Pat. No. 6,711,006 entitled "Assembling structure for peripheral accessories of portable computer," issued Feb. 6, 2002, discloses a structure that uses a clip for attaching a device to a laptop device; however, U.S. Pat. No. 6,711,006 uses a ball seat for attaching the peripheral device to the clip. Additionally, U.S. Pat. No. 6,711,006 is directed to attaching a peripheral light to illuminate the laptop keyboard. U.S. Pat. No. 6,711,006 is not suitable for use with either a hard drive device or a mobile telephone.

U.S. Pat. No. 6,851,656 entitled "Laptop computer paper support device," issued Feb. 8, 2005, discloses a device using a hanging clip that can be attached to a flat screen monitor; however, U.S. Pat. No. 6,851,656 is designed to display a paper above the screen for visual reference by the user. U.S. Pat. No. 6,851,656 does not solve the problem for attaching non-paper peripheries.

U.S. Pat. No. 6,481,681 entitled "Clip apparatus for a laptop computer," issued Aug. 30, 2000, discloses the use of an apparatus with a flange part that attaches the apparatus to a laptop flat monitor; however, U.S. Pat. No. 6,481,681 uses an unwieldy screw and locking teeth part for attaching another peripheral to the laptop. A more convenient, less mechanical solution than that if U.S. Pat. No. 6,481,681 is desired.

U.S. Pat. No. 5,619,395 entitled "Device for attaching a wireless telephone to a portable computer," discloses a device for attaching a wireless telephone device and for further attaching the device to the flat screen monitor. U.S. Pat. No. 561,935 discloses a two-piece system with a clip and clip holder to attach the device to the laptop. Therefore, U.S. Pat. No. 5,619,395 does not provide the convenience and elegance provided by a apparatus constructed from a single part.

U.S. Pat. No. 7,477,919 entitled "Handheld input/output device providing enhanced user interface for a mobile telephone," issued on Jan. 13, 2009, and U.S. Pat. No. 7,266,391 entitled "Expanded display and input-output device for mobile wireless telephone," issued on Sep. 4, 2007, both issued to Peter Warren each discloses a cradle for attachment of a mobile telephonic device to a laptop computer. The attachment in both patents lack the feature of a conveniently removable apparatus and does not feature secure and tight attachment of the device to the laptop monitor.

U.S. Pat. No. 7,533,862 entitled "Coupling mechanism for securing audio/video player onto flat panel display," issued on May 19, 2009, and US Patent Publication 20050211861 entitled "Coupling device for securing audio/video player onto flat panel display," published on Sep. 29, 2005 disclose a coupling mechanism for attaching a CD player to the flat screen of a laptop computer. The disclosures of the U.S. Pat. No. 7,533,862 patent and the 20050211861 Publication are undesirable due to the connection apparatus and its multiple piece design. It would be more desirable if an apparatus constructed as a single unit could be used to non-permanently attach a device to a laptop monitor.

U.S. Pat. No. 6,888,940 entitled "Magnetic holder for cell phones and the like," issued on May 3, 2005, discloses a cup-like magnetic holder for attaching a cellular telephone to a laptop computer. The invention of U.S. Pat. No. 6,888,940 is not well adapted for the use of mobile phones and hard drive devices because the ferrous material of the attachment could interfere with or corrupt the electromagnet data storage common in cellular telephones and hard drive devices.

U.S. Pat. No. 9,255,662B2 entitled "Mobile device mount and method of using," issued on Feb. 9, 2009, discloses the use of side mounted ball and socket camera mount. This disclosure is unsuitable for mounting a hard drive device and/or a mobile phone.

US Patent Publication 20140162733, entitled "Device holder," published on Jun. 12, 2014, discloses a device holder for mounting a cellular telephone to the flat screen of a laptop computer monitor using adhesive means. The use of adhesive means of attachment is undesirable. Such attachment means are not easily removed. Furthermore, removal of the holder is often not complete; trace adhesive is often left behind.

US Patent Publication 20130092805 entitled "Tablet Mounting Arm Systems and Methods," published on Apr. 18, 2013, discloses a tablet mounting system for attaching a tablet device to the monitor of a computer laptop. The disclosure of Publication 20130092805 is unsuitable for attaching a computer peripheral device, such as a hard drive device or mobile telephone device, because the means offer to support a tablet device are more elaborate and cumbersome than is required or desired for the attachment of a hard drive device or device of similar design. There is a desire for an attachment apparatus that is simple to install, remove and use.

The disclosures of U.S. Pat. Nos. 5,619,395, 5,769,374, 6,711,006, 6,481,681, 6,851,656, 6,888,940, 7,266,391, 7,477,919, 7,533,862, and 9,255,662 and US Patent Publications 2005-0211861, 2013-0092805 and 2014-0162733 are hereby incorporated by reference in their entireties.

There exists a need and a desire for an apparatus of single unit construction that is capable of attaching a computer peripheral device to a laptop monitor in a safe and secure fashion by a non-permanent, easily and completely removable means. It is further desirable if the apparatus could provide additional security measures by easily and completely rendering inoperable the built-in, monitor-mounted camera and/or other devices.

Presented herein is an apparatus of single unit construction that is designed and configured to securely and tightly attach a computer peripheral device such as a hard drive device or mobile telephone to the flat screen monitor of a laptop computer in a means that is simply, completely and easily removed. Additionally, such an apparatus provides additional security and privacy when said device is used in a manner to obscure and disable the use of the built-in monitor mounted camera on the laptop. Any other monitor mounted device can be disabled by deliberate configuration of the apparatus.

SUMMARY OF THE INVENTION

A mounting apparatus for securing a device to a flat monitor is disclosed. In one embodiment the mounting apparatus for securing a device to a flat monitor comprises a primary panel with an inner surface, an outer surface, an upper edge and a lower edge. The primary panel has least one base panel emanating in a perpendicular fashion from the lower edge and the inner surface of the primary panel. The apparatus further comprises a base panel. The base panel has an inner surface, an outer surface, a pair of side edges, a back edge and a front edge. The back edge of the base panel is secured to the lower edge of the primary panel. An angled panel is secured to the front edge of at least one base panel. The angled panel has an inner surface, an outer surface, a pair of side edges, and an upper edge and a lower edge. The lower edge of the angled panel is secured to the front edge of at least one base panel. The angle of alignment between the base panel and the angled panel is between 45 degrees and 90 degrees. More preferably the angle of alignment between the base panel and the angled panel is between 55 degrees and 88 degrees. Most preferably, the angle of alignment between the base panel and the angled panel is between 60 degrees and 85 degrees. The apparatus also comprises an upper panel with an inner surface, an outer surface, a front edge and a back edge. The upper panel is secured by its front edge to the top edge of the primary panel at an angle substantially perpendicular to the primary panel. The apparatus further comprises a hanging panel. The hanging panel has an inner surface, an outer surface, and an upper edge and a lower edge. The hanging panel is secured by its upper edge to the back edge of the upper panel at an angle substantially perpendicular to the upper panel and substantially parallel to the primary panel.

A mobile workstation comprising a device a computer laptop. In this workstation, the laptop is housed in a case. The laptop case comprises a top lid hinged to a bottom base. The top lid portion further comprises a flat screen monitor. The monitor has a screen side, which is positioned in the top lid such that it faces the interior of the case. The bottom base of the laptop comprises a keyboard. The keyboard is positioned such that the keys of the keyboard face the interior of the case.

Critically the workstation comprises an apparatus that physically attaches the device to the top lid section of the laptop. The apparatus comprises a primary panel with an inner surface, an outer surface, an upper edge and a lower edge. The primary panel has least one base panel emanating in a perpendicular fashion from the lower edge and the inner surface of the primary panel. The apparatus further comprises a base panel. The base panel has an inner surface, an outer surface, a pair of side edges, a back edge and a front edge. The back edge of the base panel is secured to the lower edge of the primary panel. An angled panel is secured to the front edge of at least one base panel. The angled panel has an inner surface, an outer surface, a pair of side edges, and an upper edge and a lower edge. The lower edge of the angled panel is secured to the front edge of at least one base panel. The angle of alignment between the base panel and the angled panel is between 45 degrees and 90 degrees. More preferably the angle of alignment between the base panel and the angled panel is between 55 degrees and 88 degrees. Most preferably, the angle of alignment between the base panel and the angled panel is between 60 degrees and 85 degrees. The apparatus also comprises an upper panel with an inner surface, an outer surface, a front edge and a back edge. The upper panel is secured by its front edge to the top edge of the primary panel at an angle substantially perpendicular to the primary panel. The apparatus further comprises a hanging panel. The hanging panel has an inner surface, an outer surface, and an upper edge and a lower edge. The hanging panel is secured by its upper edge to the back edge of the upper panel at an angle substantially perpendicular to the upper panel and substantially parallel to the primary panel. To complete the configuration of the workstation, the device is positioned within the pocket of the apparatus.

DETAILED DESCRIPTION OF THE INVENTION

Definitions

As used herein the terms "camera" "built-in camera" and "webcam" are used interchangeably and are used to describe the permanent digital camera that is common to most laptop computers. Such built-in cameras are most commonly located on the monitor side of the top lid of a laptop below the top edge of the case and above the top edge of the monitor. Most cameras are centered on the top edge; however, offset cameras are not uncommon.

As used herein the term "inch" means the English unit of measure for distance. As used herein, a single inch is defined as 2.54 cm. The unit inch is often abbreviated by the symbol—"—referred to as double quotation marks or double prime marks.

As used herein the terms "flat screen monitor", "flat monitor" and "laptop monitor" are used interchangeable. All are meant to mean a system display device of relatively narrow gauge when compared to the system display device constructed using cathode ray technology (CRT). It is understood that the adjective "flat" in this instance is used to designate a category of system displays and includes almost all non-CRT system displays, including, but not limited to, liquid crystal displays (LCD), light-emitting diode (LED), organic light-emitting diode (OLED) and gas-plasma technologies. It is understood that some of these system displays might be curved or convex or otherwise not geometrically flat; nevertheless, such displays are hereby categorized as "flat" by being relatively thin compared to a CRT system display of equal screen size.

As used herein the terms "mobile phone", "cellular phone", "wireless phone", "smart phone", "mobile telephone", "cellular telephone", "wireless telephone" and "smartphone" are all used interchangeably and all mean any telephonic device that does not require an RJ11 connector (or equivalent connector) either directly or via a short-distance wireless communication (i.e. cordless telephone) for such telephony.

As used herein the terms "laptop computer" and "laptop" are used interchangeably and are equivalent in meaning.

DESCRIPTION OF THE INVENTION

The present disclosure presents an apparatus for attaching a device to a flat screen monitor. Such flat screen monitors are frequently part of a laptop computer. The apparatus hangs securely from the top edge of the flat screen monitor. The apparatus comprises a pocket which is configured to accept the device. The following detailed description will provide enough detail for one skilled in the art to recognize such an apparatus, use such an apparatus and configure such an apparatus to specific needs of the skilled artisan.

The apparatus is a single unit with no moving parts—some parts do have a degree of flexibility. The apparatus functions to secure a device to a flat screen monitor, such as the monitors fixed to typical laptop computers. The apparatus solves the problem of struggling to organize and manage the operation of a laptop computer attached to one or more peripheral devices in a limited space. Even when space is abundant, the apparatus organizes the device and its connection is a safe and secure manner to prevent accidents and provide a clean working environment. Additionally, the apparatus can be used in a configuration to physically disable the built-in cameras that are common to laptop computers.

The apparatus solves the deficiency of many other solutions by its simple use and set-up. As well as, its safety and security. Other solutions have moving parts and/or multiple parts which require the user to dedicate more time to configure the inferior design for function. Here is present a single unit without moving parts that solves a common problem: safely securing a device to a flat screen monitor.

Apparatus Parts

The provided figures depict two embodiments of the invention. One skilled in the art and readily understand and comprehend the invention from the figures.

Figure 10:
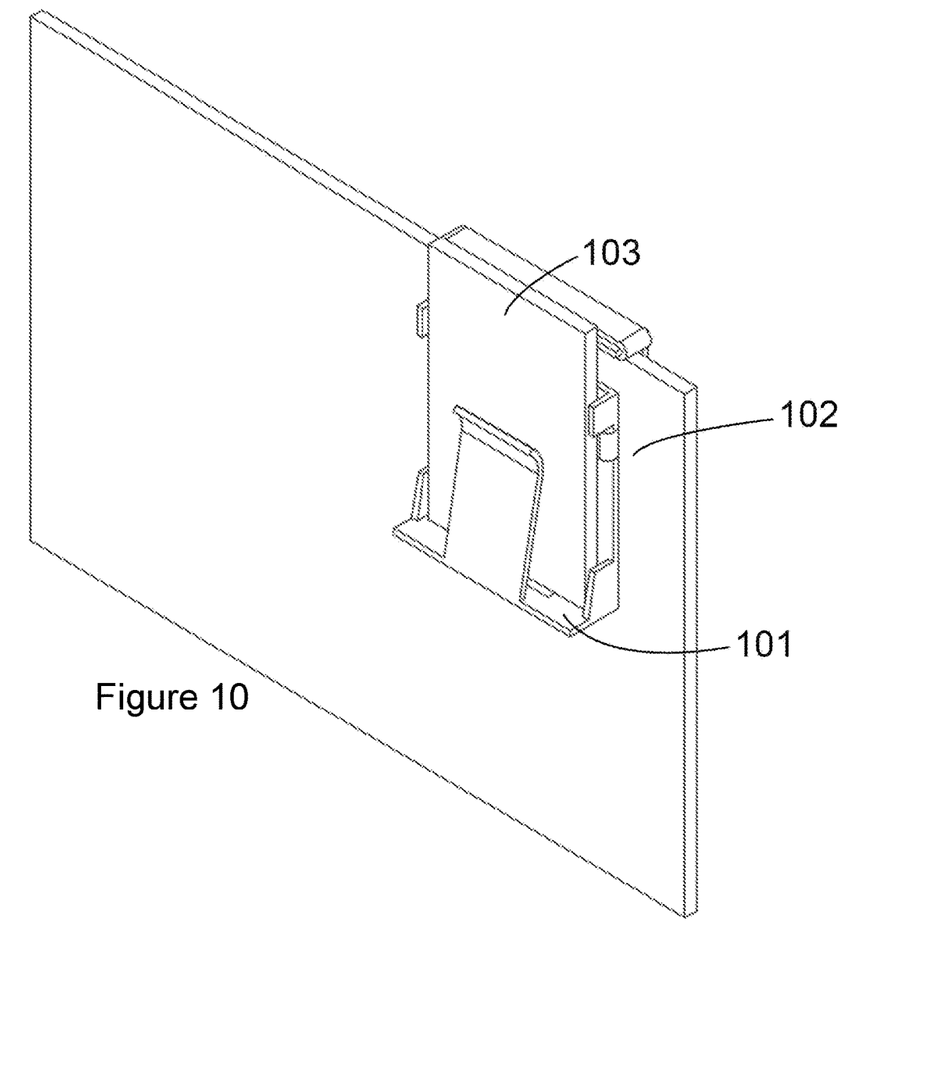
FIG. 10 is a drawing of the embodiment from Example 4 of the mounting apparatus (101) shown attached to a flat monitor (102), seen looking downwards from the back, right side three-quarters view; the apparatus is configured so as not to cover the opposite side built-in camera.
Figure 14:
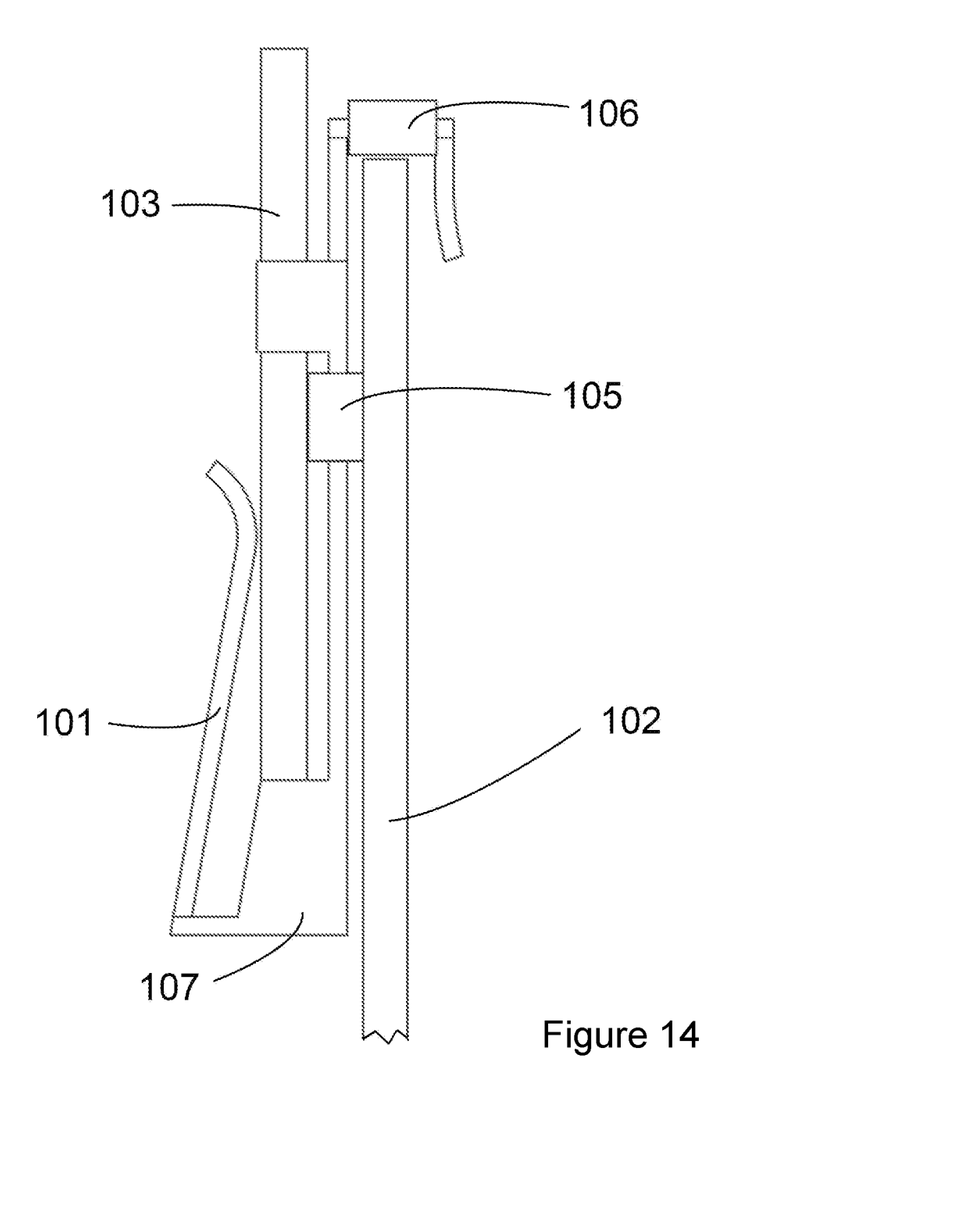
FIG. 14 is a drawing of the embodiment from Example 4 of the mounting apparatus (101) shown attached to a flat monitor (102), seen looking directly from the right side.

Referring to the figures, in FIG. 14, the apparatus (101) is shown from a direct side view as attached to a flat screen monitor (102) and cradling a device (103). The primary panel of the apparatus (101) can be seen as a vertical support parallel to the case edge of the monitor (102). The primary panel has an inner surface, an outer surface, an upper edge and a lower edge. The apparatus (101) has a base panel emanating in a perpendicular fashion from the lower edge and the inner surface of the primary panel. The base panel has an inner surface, an outer surface, a pair of side edges, a back edge and a front edge. The back edge of the base panel is secured to the lower edge of the primary panel. As can be seen in FIG. 10, this embodiment of the apparatus (101) features a cutout space of the base panel. This cut out provides a pathway for connecting wires (not shown) from the device (103) to the laptop (not shown).

Referring back to FIG. 14, in this embodiment, there are two outer panels attached to the base panel. The outer panels are secured to the front edge of the base panel in a perpendicular fashion and in a direction that is perpendicular to the primary panel. The outer panels have an inner surface, an outer surface, a pair of side edges, and an upper edge and a lower edge. The lower edge is secured to the front edge of each base panel. These outer panels provide additional security and further define the pocket that cradles the device (103). In this embodiment, the lower side panels strengthen the structural integrity of the connection between the vertical and bottom horizontal panel.

In FIG. 14, depicts the angled panel. The angled panel is secured to the front edge of at the base panel. The angled panel has an inner surface, an outer surface, a pair of side edges, and an upper edge and a lower edge, the lower edge is secured to the front edge, with the angle of alignment between 45 degree and 90 degrees in relation to the base panel. More preferably the angle of alignment with the base panel is between 50 and 85 degrees. Most preferably, the angle of alignment is between about 60 and 80 degrees. In preferred embodiments, the joint of the angled panel and the base panel has some amount of flexibility. This flexibility allows the pocket to accommodate larger devices. Furthermore, when flexed the angled panel has a greater clamping force asserted on the device increasing the hold and security of the device.

In preferred embodiments, the angled panel has a curvature. It is desired that the panel curves away from the primary panel in the portion of the panel close to the upper edge. The curvature creates a round surface to interact with the device. This increase the clamping force applied to the device providing a better hold. Also, the curved surface reduces the risk of scratching the device. Furthermore, the curve away guides the device during insertion.

In FIG. 14, it can be seen that this embodiment has a pair of side panels. The side panels are attached to the primary panel in the upper portion of the primary panel. The side panels have an inner surface, an outer surface, a pair of side edges, and an upper edge and a lower edge. The side panels are each secured to the primary panel at one side edge and to the outer panel on the opposite side edge. The side panels are generally perpendicular to the primary panel. The side panels provide additional security and help define the pocket which cradles the device (103).

In FIG. 14 it is shown there is a pocket which can be used to encase the device. The pocket is located in the space between the primary panel, the angled panel and the pair of side panels. In a preferred embodiment, the material of the apparatus allows the angled panel to flex in the curvature and the attachment to the base panel. This flexibility allows for easier insertion of the device and the increases the stability of the device within the pocket.

It can also be seen in FIG. 14, the apparatus (101) has an upper panel with an inner surface, an outer surface, a front edge and a back edge. The upper panel is secured by its front edge to the top edge of the primary panel at an angle substantially perpendicular to the primary panel. In some embodiments the upper panel is wrapped in a band of rubber or rubber-like material (106); see FIG. 13 for another view of the top band (106).

FIG. 14 also depicts a hanging panel attached to the back edge of the upper panel. The hanging panel has an inner surface, an outer surface, and an upper edge and a lower edge. The hanging panel is secured by its upper edge to the back edge of the upper panel at an angle substantially perpendicular to the upper panel and substantially parallel to the primary panel. In a preferred embodiment, the hanging panel is vertically curved slight away from the primary panel, preferably beginning in the middle of the hanging panel and extending to the lower edge.

There is a space created between the hanging panel, the upper panel and the primary panel. FIG. 14 depicts this space within the apparatus (101). Part of the space is filled with the flat screen monitor (102).

FIG. 14 depicts the apparatus (101) non-permanently attached to the flat screen monitor (102). The non-permanent attachment is achieved by allowing flat screen monitor to enter the space between the hanging panel, the upper panel and the primary panel. When non-permanently attached, the upper panel is positioned on the top edge of the lid portion of the laptop case and the hanging portion is parallel to the face of the monitor, and the primary panel is parallel to the top portion. The force of gravity secures the apparatus (101) to the top edge of the flat screen monitor (102). In some embodiments, the band depicted in FIG. 14, wrapped around the upper panel assists in creating friction to better hold the apparatus securely against the top edge of the flat screen monitor (102).

As shown in FIG. 14, the device (103) may be securely positioned within the apparatus (101). The pocket space as created by the design of the apparatus and described above is ideal for receiving a device (103). The device (103) is inserted between the angled panel and primary panel. The inserted device (103) is secured by the force and friction of primary panel and the angled panel, especially if the angled panel is flexed during insertion. Additional support and security can optionally be provided by the side panels if attached to the base panel and the arm panels extending from primary panel, if included. If included, bands can be added to the apparatus to provide yet more friction and with it more support and security. Bands can be attached anywhere on the device that contacts the flat screen monitor or the device to provide a greater hold on the inserted device. It is preferred band are attached to either the upper panel (106) or to the primary panel (105). In certain embodiments, the primary panel includes notches to help attached and hold a band.

It is understood that bands are one solution to provide an embodiment with an increased coefficient of friction at particular points of contact on the surface of the apparatus. It is further understood and recognized that there are other solutions known to the inventor and those skilled in the art to increase the coefficient of friction on a surface. For instance, the surface could be coated with a coating that increases the coefficient of friction. In another embodiment, the surface could be textured during manufacture to increase the coefficient of friction. Most known methods of increasing the coefficient of friction could be applied to the apparatus to improve the hold of the pocket and or hanging features.

All of the compositions disclosed and claimed herein can be made without undue experimentation in light of the present disclosure. While the compositions and methods of the present disclosure have been described in terms of preferred embodiments, it will be apparent to those of skill in the art that variations may be applied to the compositions described herein without departing from the concept, spirit, and scope of the invention. More specifically, it will be apparent that certain elements which are structurally related may be substituted for the elements described herein while the same or similar results would be achieved. All such similar substitutes and modifications apparent to those skilled in the art are deemed to be within the spirit, scope, and concept of the invention as defined by the appended claims.

Devices

As used herein, especially in the context of objects that can be used in the pocket of the apparatus, the term "device" means advanced computer peripheral including but not limited to "hard drive", "solid state hard drive", "platter hard drive", "hard disk drive", "HDD", "SSD", "smartphone", "robotic processing unit" or "single-board microcontroller". By the term "single-board microcontroller" it is meant a printed circuit board with minimal other features. Examples include the trademarked products RASPBERRY PI board or ARDUINO board. By the term "robotic processing unit" is it meant any programmable unit that could receive instruction or data input from a laptop and then be connected to a robot or drone to execute the instructions or operate using the data input, again the trademarked products RASPBERRY PI board or ARDUINO board are non-limiting examples of devices capable of this function that are suitable to use with the apparatus as described herein. The terms "device" and "computer peripheral device" are used interchangeable and are equivalent.

Monitors

The apparatus described herein is designed to attach the generally rectangular edge with a width that is common to most laptop flat screen monitors. The term "flat screen monitor" and its equivalents are used a laptop part with such a suitable attachment edge of that falls into those range of dimensions. In a preferred embodiment, the hanging panel is curved or flared to both assist the non-permanent attachment of the apparatus and to increase the range of flat screen monitor edges that the apparatus can receive. The optional use of a removable rubberized band (or equivalent) can further increase the range of flat screen monitor edges that can be used with the apparatus.

Materials

The apparatus as described herein can be constructed using any suitable material of combinations thereof. Suitable materials are strong enough to support the weight of the apparatus and a typical device while suspended on the upper panel; suitable materials must also be flexible enough to receive and secure a device in the pocket space. One skilled in the art will recognize how to alter the shown embodiments to suit a chosen material, as well as a chosen method of manufacture.

A non-limiting, non-exhaustive list of suitable materials includes the categories metals, silicones, plastics, carbon fibers, fiberglass and woods. It is recognized that combinations of these materials could be used to practice the invention, including combinations within a category (e.g. steel and bronze) and combinations of members of different categories (e.g. metal wire and silicone coating).

Configurations and Uses Thereof

The Drawings depict the apparatus used in at least two configurations; however, it is understood that the device can be configured in several useful ways to assist users with their use of a laptop computer.

Figure 2:
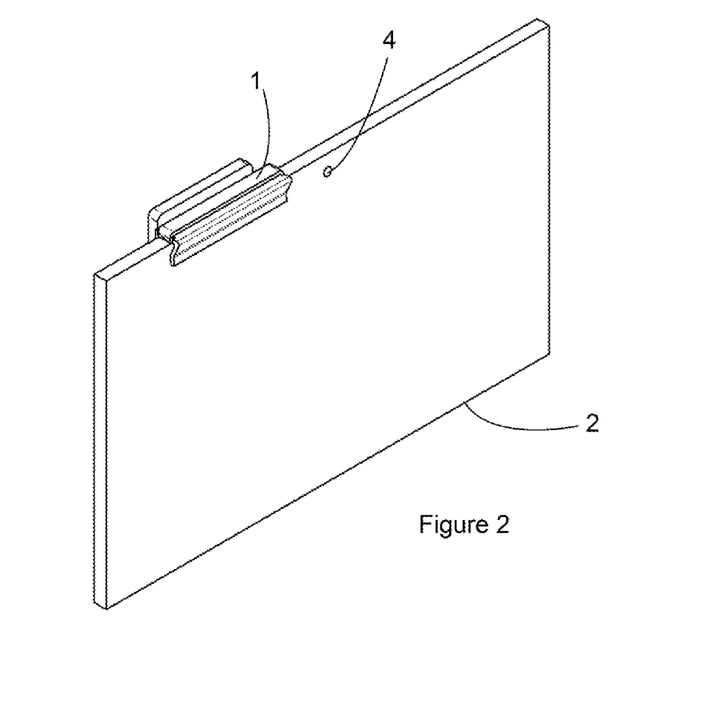
FIG. 2 is a drawing that depicts the mounting apparatus (1), as embodied in Example 1, in a position on the flat monitor (2) where a camera (4) is not obscured.
Figure 3:
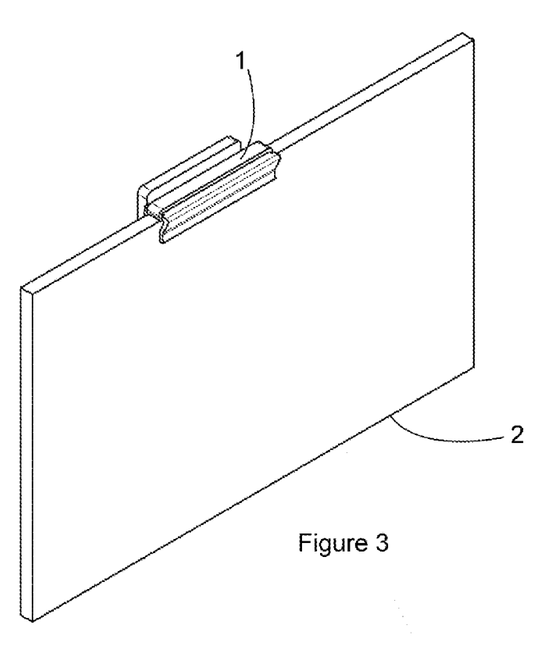
FIG. 3 is a drawing that depicts the mounting apparatus (1), as embodied in Example 1, in a position on the flat monitor (2) where a camera (not shown) is obscured.
Figure 11:
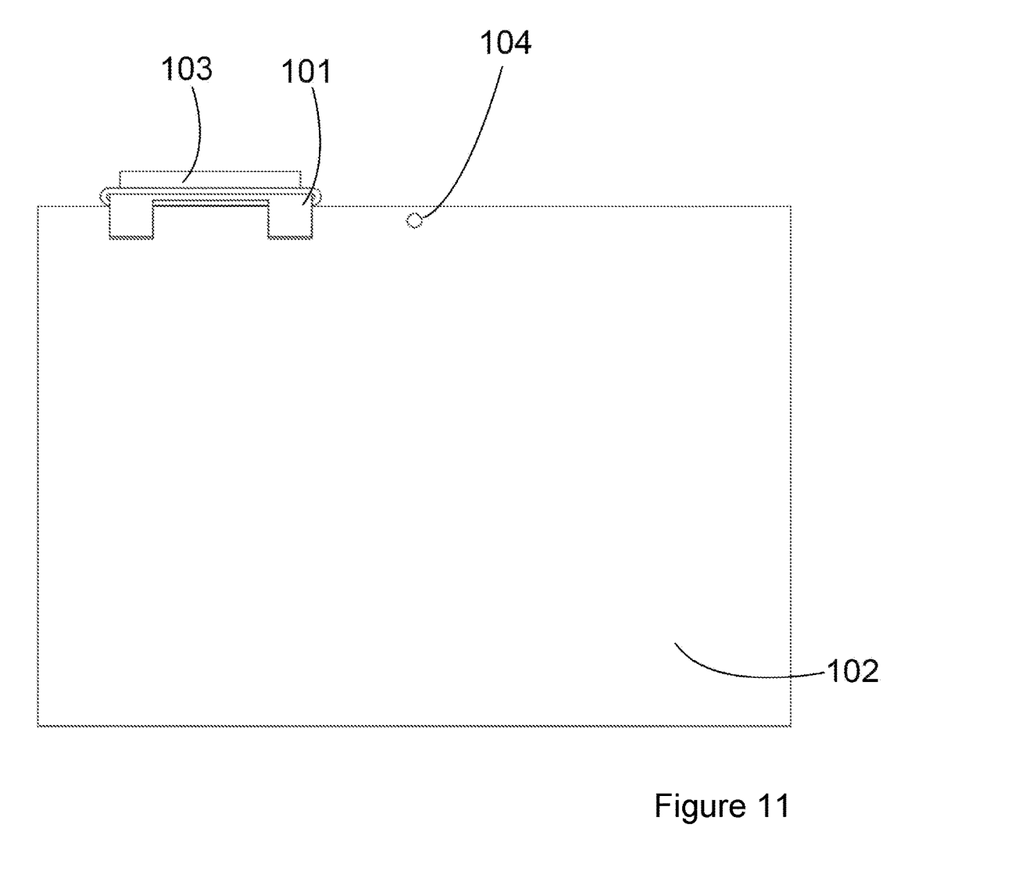
FIG. 11 is a drawing of the embodiment from Example 2 of the mounting apparatus (101) shown attached to a flat monitor (102), seen looking straight ahead from the front; the apparatus is configured so as not to cover the built-in camera (104)
Figure 12:
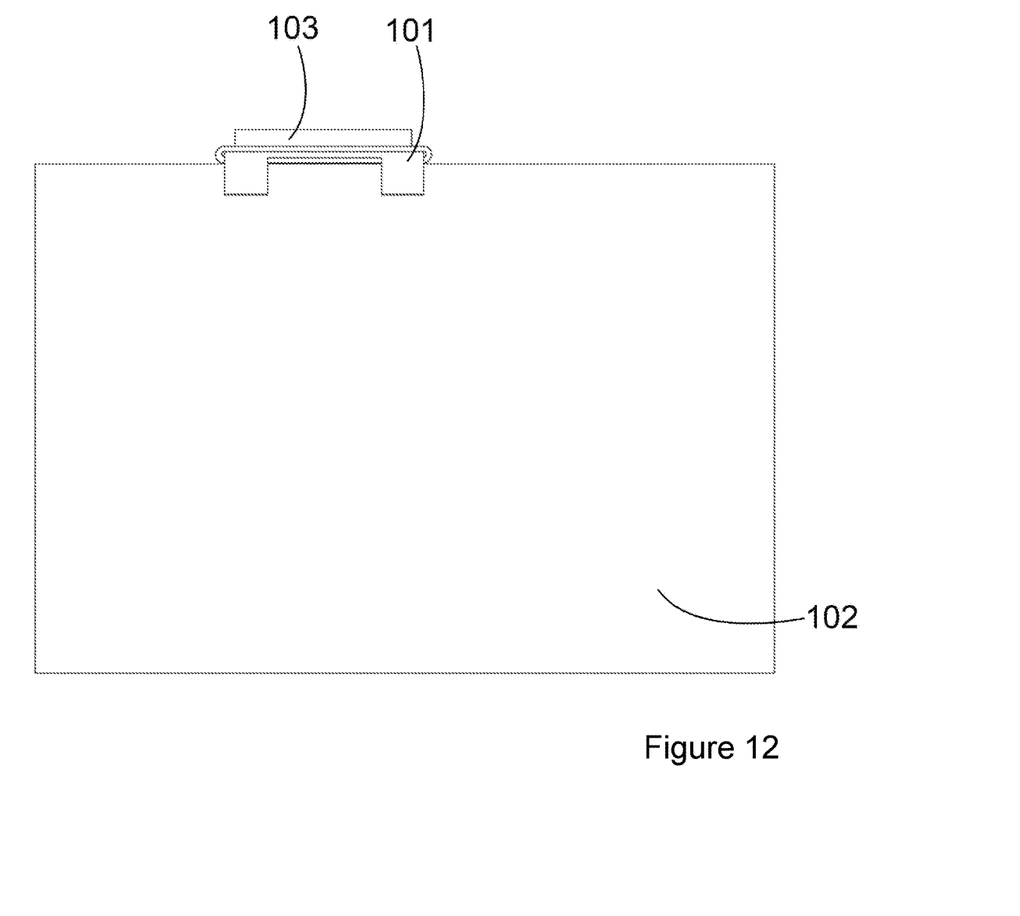
FIG. 12 is a drawing of the embodiment from Example 4 of the mounting apparatus (101) shown attached to a flat monitor (102), seen looking straight ahead from the front; the apparatus is configured to cover the built-in camera (not shown)

In particular, FIGS. 2 and 11 depict the use of the apparatus with the flat screen monitor of a mobile device such that the apparatus can hold a device while hanging on the laptop and not interfere with the use of the laptop's built-in camera. Juxtaposed to that, FIGS. 3 and 12 depict the use of the apparatus with the flat screen of a mobile device such that the apparatus can hold a device while hanging on the laptop and physically disabling the laptop's built-in camera. FIG. 12, depicts the left side hanging panel covering the camera lens, obviously the right side hanging panel could equally effectively cover and disable the laptop's built-in camera.

Although not depicted in the figures, it is known that the apparatus can be configured to work surprisingly well with smartphones. If the smartphone is positioned in the pocket such that the built-in smartphone camera lens is visible above the upper panel the apparatus can be used as a stand for the phone during video conferences. In this configuration, the apparatus also serves as 'tripod' for personal photography (e.g. selfies). This configuration might also allow for enough of the smartphone screen to be visible during the use of the laptop so that alerts can he read while using the laptop.

Figure 13:
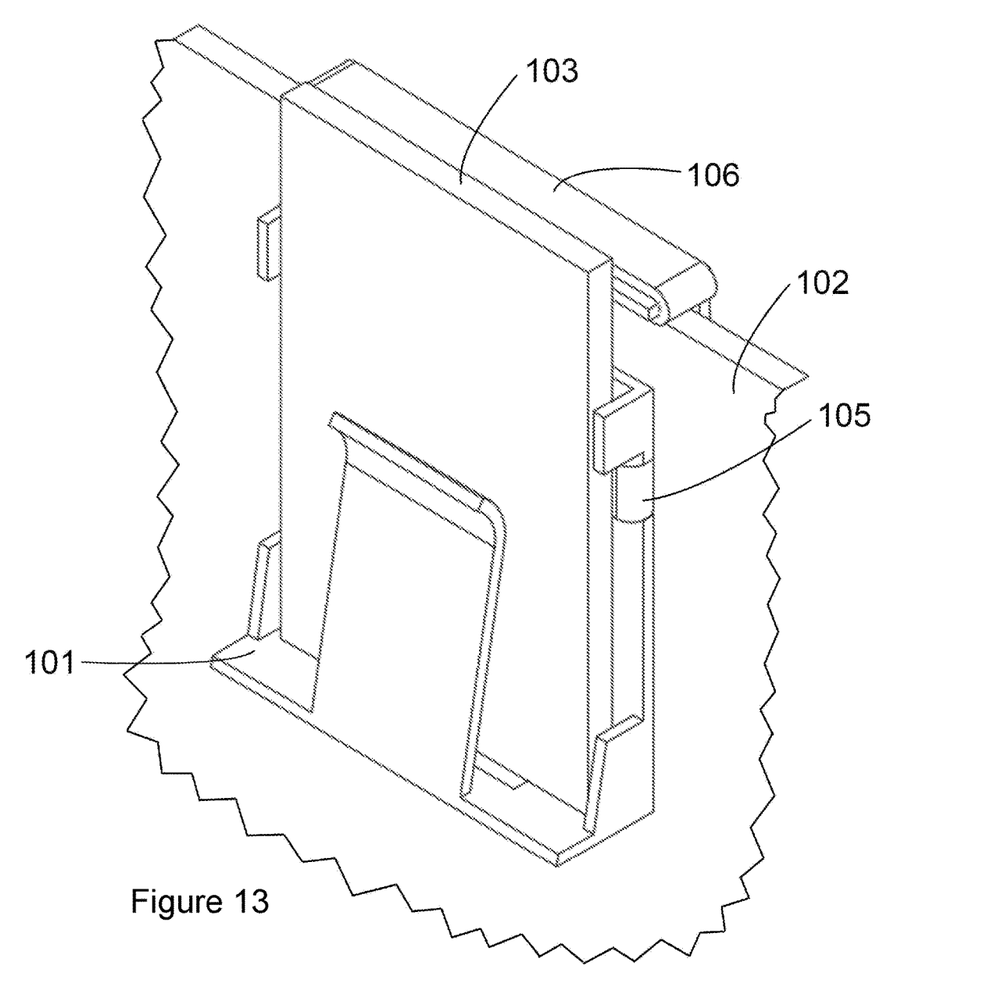
FIG. 13 is a drawing of the embodiment from Example 4 of the mounting apparatus (101) shown attached to a flat monitor (102), seen looking downwards from the back, right side three-quarters view; the apparatus is configured with the bands (105) attached to the apparatus.

It is also understood that the removable rubberized bands can be configured to wrap around the device in the pocket in addition to being wrapped around the apparatus. Looking at FIG. 13, the apparatus (101) is depicted with a band (105) wrapped around the primary panel just below the arm panels. In FIG. 13, the band (105) surrounds only the primary panel of the apparatus. However, in this embodiment, the band wraps around both the primary panel and the device. This particular configuration can be achieved by stretching the band out wide enough prior to the insertion of the device in the pocket, or by removing the band, inserting the device into the pocket then reattaching the band so that it envelopes both the device and the primary panel.

However, the configuration is achieved, when one or more rubberized bands wrap around both the device and the primary panel the hold on the device is increased. Obviously, in this configuration, it is more difficult to intentionally remove the device; this is a sacrifice for greater security and stability of the device in the pocket.

Various related embodiments are recognized where at least one band is wrapped around the arm panels or the side panels. Either or both the arm panels and side band could be modified with a slot or notch to better accommodate receiving a band to surround the panels and the device.

Another related embodiment builds on the configuration of the band wrapping around both the device and the apparatus by including a method of securing the bottom of the primary panel to the flat screen monitor. One method of implementing this embodiment is to introduce a notch or hole in the bottom section of the primary panel and use the notch or hold to secure a suction cup with the cup aligned on the same side of the primary panels that is attached to the upper panel. After attaching the device to a flat screen monitor the suction cup attached the primary panel can be non-permanently engaged with the monitor. In this configuration, the apparatus is highly secure to the flat screen monitor and the device is very secure within the pocket. In this configuration, the device-apparatus-monitor may be able to be inverted and retain the attachment of the apparatus to the monitor and the device within the apparatus pocket. This configuration may, therefore, be suitable for use with a tablet, especially when the device is a smartphone.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Example 1

Figure 1:
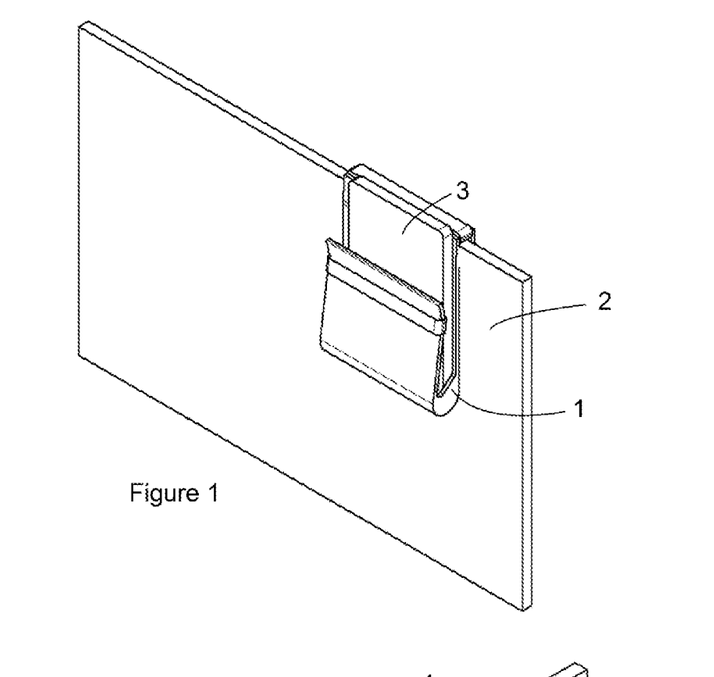
FIG. 1 is a drawing that depicts the mounting apparatus (1), as embodied in Example 1, securing a device (3) to a flat monitor (2)

FIG. 1 shows the apparatus (1) attached to a flat screen monitor (2). The apparatus is shown as embodied in Example 1 and is viewed from the outside case side of the flat screen monitor. The upper portion of the apparatus (1) is shown in contact with the upper edge of the monitor (2). The apparatus (1) is further secured by the hanging portion extending over the edge of the flat screen monitor (2).

FIG. 2 shows the view of the configuration of FIG. 1 from the monitor side of the flat screen monitor, that is opposite of the case side and the reverse view from FIG. 1. The apparatus is shown as embodied in Example 1. The apparatus (1) attached to a flat screen monitor (2) in such a way so as not to obscure the camera (4) embedded in the edge of the laptop case (4). In this configuration, the embedded camera (4) is able to function normally and record images.

FIG. 3 also shows the apparatus (1) from the monitor side of the flat screen monitor; however, opposed to FIG. 2, the apparatus is positioned on the monitor (2) in order to obscure the built-in camera (not shown). In this configuration, the hanging panel of the apparatus blocks light from entering the camera lens, therefore, disabling its function and providing privacy to the user. This physical defeat of the function of the camera is immune to hacking attacks which are known to overcome powering off the camera by software.

Figure 4:
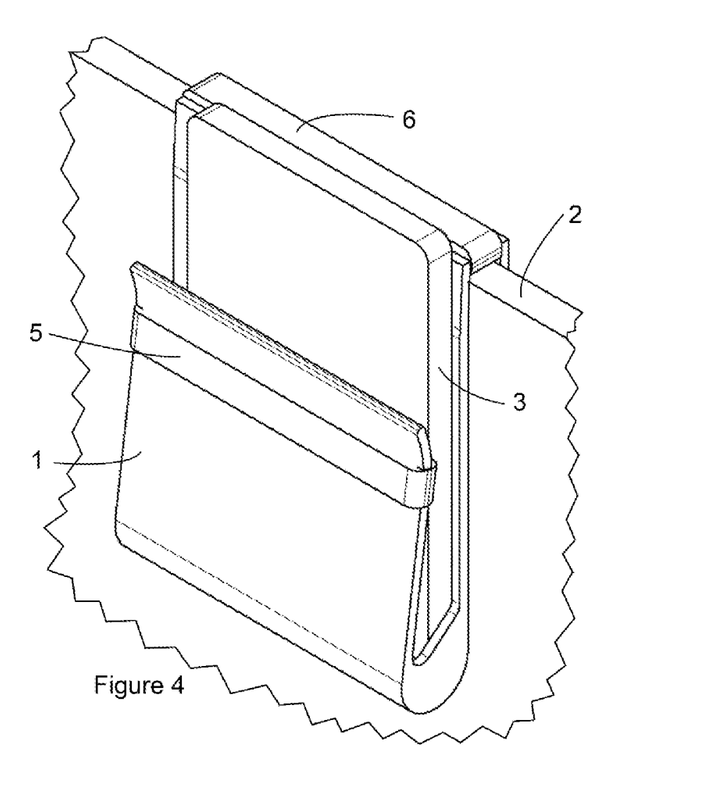
FIG. 4 is a drawing of the embodiment from Example 1 of the mounting apparatus (1) shown attached to a flat monitor (2), seen looking downwards from the right side three-quarters view.

FIG. 4 depicts an alternative embodiment featuring an angled panel. The angled panel possessing an inner surface, an outer surface, an upper edge and the lower edge. Wherein the angled panel is secured by its lower edge at an angle from the upper edge of the primary panel in a direction which is opposite the direction of the base pair panels.

Figure 5:
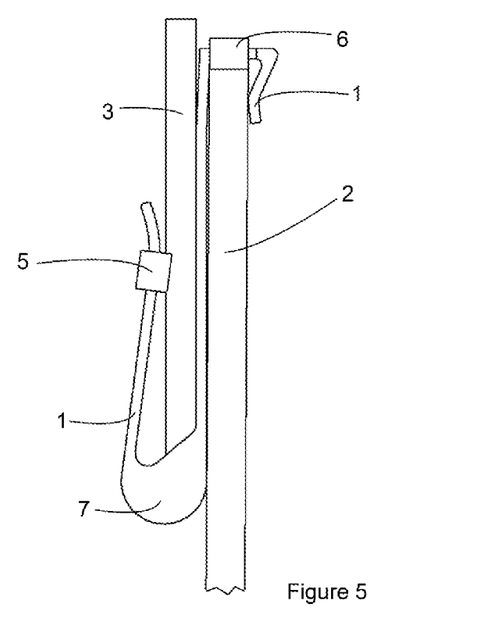
FIG. 5 is a drawing of the embodiment from Example 1 of the mounting apparatus (1) shown attached to a flat monitor (2), seen looking directly from the right side.
Figure 6:
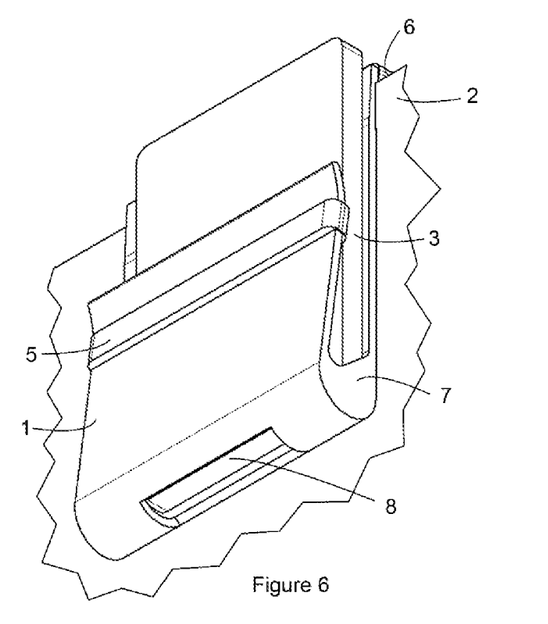
FIG. 6 is a drawing of the embodiment from Example 1 of the mounting apparatus (1) shown attached to a flat monitor (2), seen looking upwards from the right side.

FIGS. 4, 5, and 6 show the mounting apparatus (1) with an upper band (6) installed to increase friction between the mounting apparatus (1) a flat monitor (2). The friction between the upper band (6) and the flat monitor (2) secures the mounting apparatus (1) to a flat monitor (2). FIG. 5a shows an embodiment where the mounting apparatus (1) is also secured by the clamping force of the mounting apparatus.

FIGS. 4, 5, and 6 also show the mounting apparatus (1) with a lower band (5) to increase friction between the mounting apparatus (1) and a device (3). The section of the mounting apparatus (1) which secures the device (3) to the mounting apparatus (1) may flex to adapt to variable device (3) thickness. A device (3) is secured to the mounting apparatus (1) by the weight of the device (3), the clamping force of the mounting apparatus (1), friction between the mounting apparatus (1) and the device (3), or a combination thereof. The base panel (7) of the mounting apparatus (1) prevents the device (3) from sliding out of the mounting apparatus (1).

In function, a suitable device (3) is positioned in the pocket defined by the edges of the primary panel, the angled panel the base panel and a pair of side panels. The hold of the pocket is enhanced by the presence of an elastic band (5). The device (3) and apparatus (1) can be hung on the flat screen monitor (2) to complete the configuration. The non-permanent attachment of the apparatus (1) to the flat screen monitor (2) is similarly enhanced by the presence of an elastic band (6) on the upper panel.

FIG. 6 shows the non-enclosed form of the mounting apparatus (1) to provide access to the device (3) to install necessary cables for operation of the device (3).

Example 2

Figure 7:
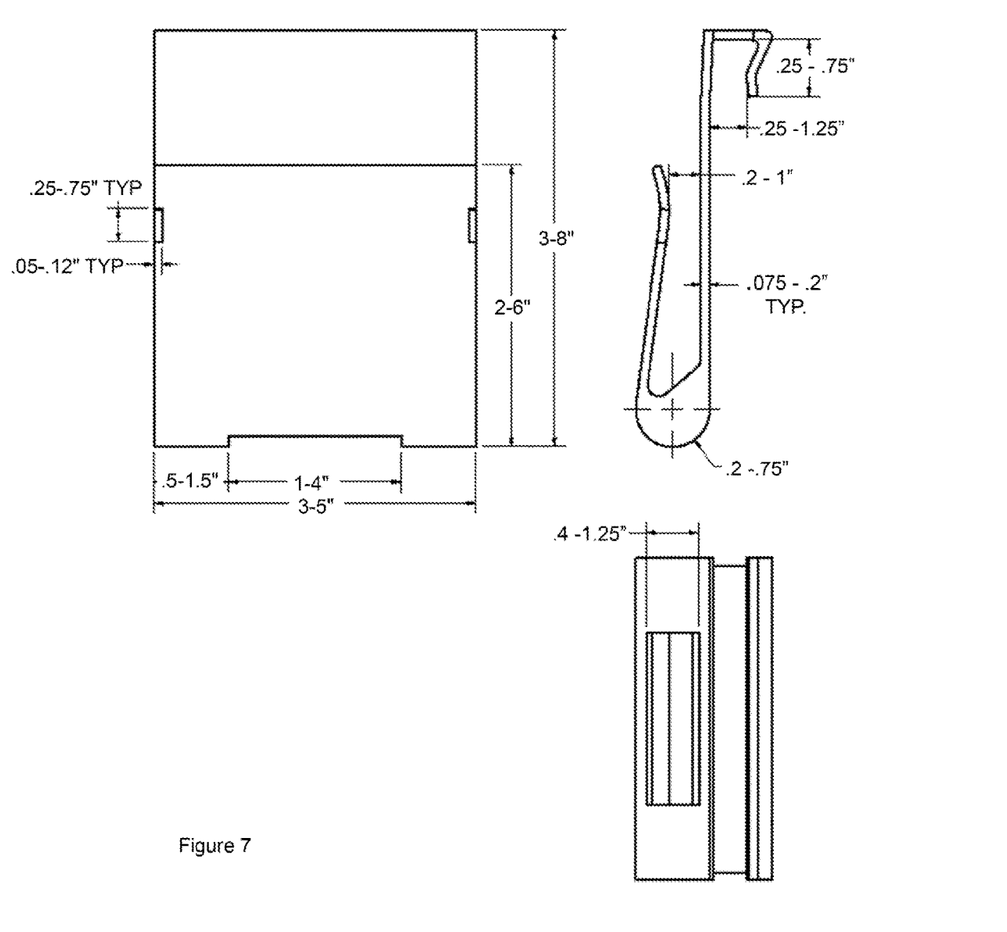
FIG. 7 is a schematic of the embodiment from Example 2 of the mounting apparatus showing the dimensions of the embodiment in inches.

FIG. 7 shows dimensions of the mounting apparatus (1) without bands installed. One skilled in the art will appreciate that the absolute measurements are provided as a guide and relative length of elements. Although the explicit measurements could be followed to practice this particular embodiment of the invention, the measurements are not intended to be limited. Units shown are in inches; one inch equals 2.54 cm.

Example 3

Figure 8:
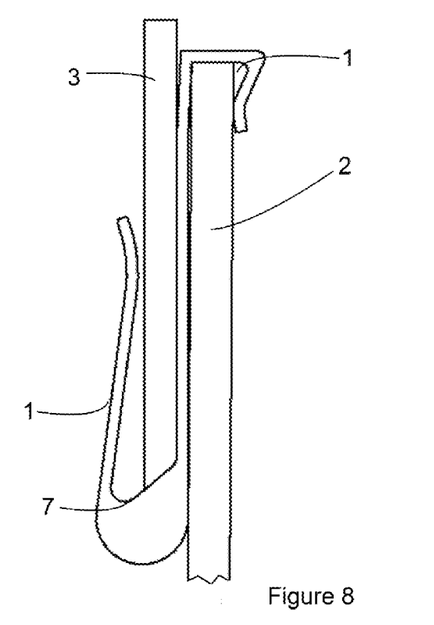
FIG. 8 is a drawing of an alternative embodiment from Example 3 of the mounting apparatus (1) shown attached to a flat monitor (2), seen looking upwards from the right side; the apparatus is shown as configured without a band.
Figure 9:
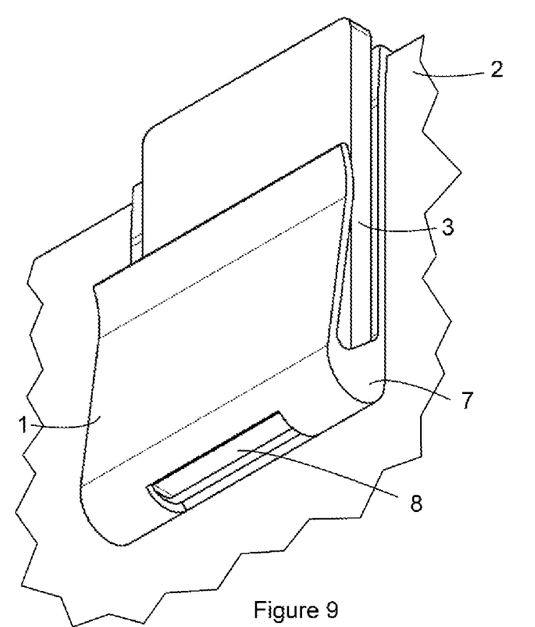
FIG. 9 is a drawing of the embodiment from Example 3 of the mounting apparatus (1) shown attached to a flat monitor (2), seen looking upwards from the right side; the apparatus is shown as configured without a band.

FIGS. 8 and 9 shows an alternate embodiment where the mounting apparatus (1) secures a device (3) to a flat monitor (2) without the upper or lower band. The mounting apparatus is secured to the flat monitor by the weight of the assembly, clamping force of the mounting apparatus, friction between the mounting apparatus and the flat monitor, or a combination thereof. A device is secured to the mounting apparatus by the weight of the device, clamping force of the mounting apparatus, friction between the mounting apparatus and the device, or a combination thereof.

Example 4

Depicted in FIGS. 10-14 is the most preferred form of the invention. FIG. 10 shows the apparatus (101) non-permanently attached to flat screen monitor (102). A suitable device (103) is positioned in the pocket defined by the edges of the primary panel, the angled panel the base panel a pair of arm panels and a pair of side panels. The hold of the pocket is enhanced by the presence of an elastic band attached to the primary panel just below the junction of the arm panels and the primary panel. The non-permanent attachment of the apparatus (101) to the flat screen monitor (102) is also enhanced by the addition of an elastic band to the upper panel.

This configuration permits the use of the built-in camera of flat screen monitor (102) (although the camera is not visible in this view).

FIG. 11 with a view of the same configuration from the screen side of the flat screen monitor (102), clearly shows how this configuration of the apparatus (101), device (103) and monitor (102) permits the use of the built-in camera (104). The apparatus is situated left of the camera (104) allowing the camera to function normally.

However, in FIG. 12, the configuration of the apparatus (101), device (103) and monitor (102) is moved towards the center such that the hanging panel obscures the camera (not visible is the view). In this configuration, the camera is not operational. While the camera optics are active, the camera is not functional because light is physically blocked from entering the camera lens by the position of the attachment of the apparatus (101) on the flat screen monitor (102).

FIG. 13 clearly depicts the position and use of elastic bands to improve the security of the pocket hold and the attachment of the apparatus (101) to the flat screen monitor (102) in this example. In FIG. 13, the device (103) is shown position in the pocket defined by the edges of the primary panel, the angled panel the base panel a pair of arm panels and a pair of side panels. The hold of the pocket is enhanced by the presence of an elastic band (105) attached to the primary panel just below the junction of the arm panels and the primary panel. The non-permanent attachment of the apparatus (101) to the flat screen monitor (102) is also enhanced by the addition of an elastic band (106) to the upper panel.

Likewise, FIG. 14, a side view of the same configuration, depicts the use of the elastic bands from a side perspective. The device (103) is shown inserted into the pocket defined by the edges of the primary panel, the angled panel the base panel a pair of arm panels and a pair of side panels. The elastic band (105) is shown attached to the primary panel. The presence of the elastic band (105) enhances the security of the hold of the pocket on the device (103). The flexibility of the band material increases the friction of the hold. Also, the flexibility of the band reduces the effect of vibration either emanating from the device (103) or emanating from the environment which might affect the device (103).

FIG. 14 also depicts the use of an elastic band (106) to enhance the attachment of the apparatus (101) to the flat screen monitor (102). The apparatus (101) is shown non-permanently attached to the flat screen monitor (102). The elastic band (106) is shown attached to the upper panel of the apparatus (101). The presence of the elastic band (106) increases the fiction in the attachment of the apparatus (101) to the flat screen monitor (102) thereby enhancing the hold of the non-permanent attachment. Also, the flexibility of the band reduces the effect of vibration either emanating from the monitor (102) or emanating from the environment which might affect the monitor (102).

I claim:

1. A mounting apparatus for securing a device to a flat monitor comprising:
   a primary panel with an inner surface, an outer surface, an upper edge and a lower edge;
   at least one base panel emanating in a perpendicular fashion from the lower edge and the inner surface of the primary panel,
     said base panel has an inner surface, an outer surface, a pair of side edges, a back edge and a front edge,
       wherein the back edge being secured to the lower edge of the primary panel;
   an angled panel secured to the front edge of at least one base panel,
     said angled panel having an inner surface, an outer surface, a pair of side edges, and upper edge and a lower edge,
     wherein the lower edge being secured to the front edge of at least one base panel,
     wherein the angle of alignment between the base panel and the angled panel is between 45 degrees and 90 degrees;
   an upper panel with an inner surface, an outer surface, a front edge and a back edge,
     wherein the upper panel is secured by its front edge to the top edge of the primary panel at an angle substantially perpendicular to the primary panel; and
   a hanging panel with an inner surface, an outer surface, and upper edge and a lower edge,
     wherein the hanging panel is secured by its upper edge to the back edge of the upper panel at an angle substantially perpendicular to the upper panel and substantially parallel to the primary panel.

2. The apparatus of claim 1 wherein said hanging panel being long enough to obscure a camera located on the top of the flat monitor.

3. The apparatus of claim 1 wherein the apparatus is made of a material selected from the group consisting of metal, silicone, plastic, carbon fiber, wood fiber and a combination of two or more of the aforementioned group members.

4. The apparatus of claim 1 wherein the apparatus is a flexible in a manner such that the apparatus can be attached to various flat monitors with a range of thicknesses.

5. The apparatus of claim 1 wherein the apparatus may have one or more bands added to increase the force of friction between the apparatus, flat monitor, device, or a combination thereof.

6. The apparatus of claim 1 wherein the apparatus further comprises at least a pair of base panels emanating from the primary panel.

7. The apparatus of claim 1 wherein the angled panel layer of the apparatus is curved out from the primary panel in the upper portion of the angled panel.

8. The apparatus of claim 6, wherein the apparatus further comprises:
   a pair of side panels having an inner surface, an outer surface, a pair of side edges, and upper edge and a lower edge;
     said side panels each being secured to the primary panel at one side edge and to a base panel on the lower edge.

9. The apparatus of claim 1, wherein the apparatus further comprises:
   a pair of arm panels having an inner surface, an outer surface, a pair of side edges, and upper edge and a lower edge;
     said arm panels each being secured to the primary panel at one side such that the arm panels are generally perpendicular to the primary panel, the hanging panel;
     said arm panels are substantially similar in width from one side edge to the other as a base panel from the front edge to the back edge.

10. The mounting apparatus for securing a device to a flat monitor of claim 9, wherein the apparatus further comprises:
    a pocket used to encase the device,
      wherein the pocket is located in the space between the primary panel, at least one base panel, the angled panel, the pair of arm panels and the pair of side panels.

11. The apparatus of claim 10 wherein the device which will fit into the pocket selected from the group consisting of a hard drive, a cell phone, a smart phone robotic processing unit or a single-board microcontroller.

12. The apparatus of claim 1, wherein the apparatus further comprises:
    a gap located between the primary panel/angled panel, the upper panel and the hanging panel,
      said gap is designed to engage the top of a flat monitor and hang vertically behind a monitor screen.

13. The apparatus of claim 1, wherein angled panel is between about 50 degrees and 88 degrees.

14. The apparatus of claim 13, wherein angled panel is between about 60 degrees and 85 degrees.

15. The apparatus of claim 1, wherein a suction cup is attached to the outer surface of primary panel, wherein the point of attachment of said suction cup is within the lower half of the primary panel.

16. A mobile workstation comprising:
    a device;
    a computer laptop, wherein the laptop is housed in a case, the case comprising a top lid hinged to a bottom base,
      wherein the top lid portion further comprises a flat screen monitor, the monitor has a screen side, wherein the screen side is positioned in the top lid such that it faces the interior of the case;
wherein the bottom base further comprises a keyboard, wherein the keyboard is positioned such that the keys of the keyboard face the interior of the case;
an apparatus that physically attaches the device to the top lid section of the laptop;
Wherein the apparatus comprises:
a primary panel with an inner surface, an outer surface, an upper edge and a lower edge;
at least one base panel emanating in a perpendicular fashion from the lower edge and the inner surface of the primary panel,
said base panel has an inner surface, an outer surface, a pair of side edges, a back edge and a front edge,
wherein the back edge being secured to the lower edge of the primary panel;
an angled panel secured to the front edge of at least one base panel,
said angled panel having an inner surface, an outer surface, a pair of side edges, and upper edge and a lower edge,
wherein the lower edge being secured to the front edge of at least one base panel,
wherein the angle of alignment between the base panel and the angled panel is between 45 degree and 90 degrees;
a pair of side panels having an inner surface, an outer surface, a pair of side edges, and upper edge and a lower edge;
said side panels each being secured to the primary panel at one side edge and to the outer panel on the opposite side edge;
a pair of arm panels having an inner surface, an outer surface, a pair of side edges, and upper edge and a lower edge;
said arm panels each being secured to the primary panel at one side such that the arm panels are generally perpendicular to the primary panel, the hanging panel;
said arm panels are generally the same width from one side edge to the other as a base panel from the front edge to the back edge
a pocket used to encase the device,
wherein the pocket is located in the space between the primary panel, at least one base panel, the angled panel, the pair of arm panels and the pair of side panels;
an upper panel with an inner surface, an outer surface, a front edge and a back edge,
wherein the upper panel is secured by its front edge to the top edge of the angled panel at an angle substantially perpendicular to the primary panel; and
a hanging panel with an inner surface, an outer surface, and upper edge and a lower edge,
wherein the hanging panel is secured by its upper edge to the back edge of the upper panel at an angle substantially perpendicular to the upper panel and substantially parallel to the primary panel;
wherein the device is positioned in the pocket of the apparatus; and
The apparatus is attached to the top lid portion of the case of the laptop;
Wherein the upper panel is positioned on the top edge of the lid portion of the laptop case and the hanging portion is parallel to the face of the monitor, and the primary panel is parallel to the top portion
And wherein the device is positioned within the pocket of the apparatus.

17. The work station of claim 16, wherein
The laptop comprises a camera with a lens, and
Wherein the camera is embedded in top portion of the laptop case, on the top edge such that the lens faces the interior of the laptop case; and
Wherein the apparatus is position such that the hanging portion of the apparatus obscures the lens of the camera.

18. The work station of claim 16, wherein the device is a smartphone;
Wherein the smartphone has a top edge and a bottom edge;
Wherein the smartphone is positioned in the pocket such that the top edge extends beyond the upper panel of the apparatus.

* * * * *